(12) United States Patent
Meng et al.

(10) Patent No.: US 10,803,621 B2
(45) Date of Patent: Oct. 13, 2020

(54) METHOD AND DEVICE FOR BUILDING CAMERA IMAGING MODEL, AND AUTOMATED DRIVING SYSTEM FOR VEHICLE

(71) Applicant: Beijing Smarter Eye Technology Co. Ltd., Beijing (CN)

(72) Inventors: Ran Meng, Beijing (CN); An Jiang, Beijing (CN); Haitao Zhu, Beijing (CN); Feng Cui, Beijing (CN); Hua Chai, Beijing (CN); Zunying Pang, Beijing (CN)

(73) Assignee: BEIJING SMARTER EYE TECHNOLOGY CO. LTD., Beijing (CN)

( * ) Notice: Subject to any disclaimer, the term of this patent is extended or adjusted under 35 U.S.C. 154(b) by 87 days.

(21) Appl. No.: 16/254,321

(22) Filed: Jan. 22, 2019

(65) Prior Publication Data

US 2020/0034987 A1 Jan. 30, 2020

(30) Foreign Application Priority Data

Jul. 25, 2018 (CN) .......................... 2018 1 0823524

(51) Int. Cl.
*G06T 7/80* (2017.01)
*B60R 11/04* (2006.01)
*G05D 1/00* (2006.01)
*G06T 17/05* (2011.01)

(52) U.S. Cl.
CPC ................ *G06T 7/80* (2017.01); *B60R 11/04* (2013.01); *G05D 1/0088* (2013.01); *G06T 17/05* (2013.01)

(58) Field of Classification Search
CPC .................................... G06T 7/80; G06T 17/05
See application file for complete search history.

(56) References Cited

U.S. PATENT DOCUMENTS

2005/0089213 A1\* 4/2005 Geng ................. G06K 9/00214
382/154

\* cited by examiner

*Primary Examiner* — Tuan H Nguyen
(74) *Attorney, Agent, or Firm* — Novick, Kim & Lee, PLLC; Allen Xue

(57) ABSTRACT

A method for building a camera imaging model includes: converting world coordinate values of a random point P into camera coordinate values of a target camera in accordance with a predetermined mode; converting the camera coordinate values into image coordinate values of the target camera; and converting the image coordinate values into digital image coordinate values and building the camera imaging model. The converting the image coordinate values into the digital image coordinate values includes performing a spatial sampling operation on the random point P, and adjusting coordinate values of an origin to image coordinate values through calculation. The method can be used in an automated driving system for a vehicle.

11 Claims, 8 Drawing Sheets

METHOD AND DEVICE FOR BUILDING CAMERA IMAGING MODEL, AND AUTOMATED DRIVING SYSTEM FOR VEHICLE

FIELD OF THE INVENTION

The present disclosure relates to the field of image processing technology, in particular to a method and a device for building a camera imaging model, and an automated driving system for a vehicle.

BACKGROUND OF THE INVENTION

Usually, an imaging system of a camera consists of lenses and an image sensor. An imaging procedure is very complex, so there are many distortions between a real physical space and a digital image space, e.g., a distortion of an aspect ratio (caused by different sampling intervals of the image sensor), a distortion of planar perspective projection (caused by an imaging angle) and an optical distortion (caused by a distortion of the lenses). For a conventional imaging system, its distortions are acquired by superimposing linear distortions and nonlinear distortions, and these distortions form a camera imaging model. During the calibration of the camera, unknown parameters are calculated in accordance with the camera imaging model. It is able to, merely through the camera imaging model, describe a conversion relationship between the digital image space (i.e., a digital image coordinate system) and the real physical space (i.e., a world coordinate system) as follows: Image (x,y)<<P(a, b, c . . . )<<World(X,Y,Z).

In the above formula, World(X,Y,Z) represents three-dimensional coordinate values (X,Y,Z) of a certain spatial point in the world coordinate system, Image(x,y) represents two-dimensional coordinate values (x,y) of the digital image coordinate system, P represents the camera imaging model, and a, b, c . . . represent parameters in the camera imaging model. During the calibration of the camera, the parameters a, b, c . . . are solved after the camera imaging model P has been determined. For a certain spatial point in the world coordinate system, the digital image coordinates of the spatial point may be acquired in accordance with the three-dimensional coordinates of the spatial point and the camera imaging model.

Different imaging models may be adopted by different imaging systems (e.g., imaging systems of a fisheye camera, an underwater camera, a wide-viewing-angle camera and a narrow-viewing-angle camera). After the imaging models have been built, the parameters in these models (called as interior and exterior parameters of the cameras) are calculated during the calibration, so as to finally acquire the interior and exterior parameters for describing the imaging systems. The accuracy of the description about the imaging system directly depends on the camera imaging model.

There are such problems in the related art where the calibration of the camera is relatively slow due to an unscientific imaging model, and the camera imaging system is described inaccurately through the interior and exterior parameters acquired after the calibration.

SUMMARY

An object of the present disclosure is to provide a method and a device for building a camera imaging model, and an automated driving system for a vehicle, so as to solve the problem in the related art where the camera imaging system is described inaccurately through the interior and exterior parameters acquired after the calibration due to the unscientific imaging model.

In one aspect, the present disclosure provides in some embodiments a method for building a camera imaging model, including: converting world coordinate values of a random point P into camera coordinate values of a target camera in accordance with a predetermined mode; converting the camera coordinate values into image coordinate values of the target camera; and converting the image coordinate values into digital image coordinate values and building the camera imaging model. The converting the image coordinate values into the digital image coordinate values includes performing a spatial sampling operation on the random point P, and adjusting coordinate values of an origin to image coordinate values through the following formula:

$$\begin{cases} u = k_u x + u_0 \\ v = k_v y + v_0 \end{cases} \text{ or} \qquad (1)$$

$$\begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix},$$

where $k_u=1/dx$, $k_v=1/dy$, dx and dy represent a horizontal sampling interval and a longitudinal sampling interval of an image sensor of the target camera respectively, $(u_0,v_0)$ represents a translational amount between two origins in an image coordinate system and a digital image coordinate system, (x,y) represents the image coordinate values of the random point P, and (u,v) represents the digital image coordinate values of the random point P.

In another aspect, the present disclosure provides in some embodiments a device for building a camera imaging model, including: a first conversion module configured to convert world coordinate values of a random point P into camera coordinate values of a target camera in accordance with a predetermined mode; a second conversion module configured to convert the camera coordinate values into image coordinate values of the target camera; and a building module configured to convert the image coordinate values into digital image coordinate values and build the camera imaging model. The building module is further configured to perform a spatial sampling operation on the random point P, and adjust coordinate values of an origin to image coordinate values through the following formula:

$$\begin{cases} u = k_u x + u_0 \\ v = k_v y + v_0 \end{cases} \text{ or} \qquad (1)$$

$$\begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix},$$

where $k_u=1/dx$, $k_v=1/dy$, dx and dy represent a horizontal sampling interval and a longitudinal sampling interval of an image sensor of the target camera respectively, $(u_0,v_0)$ represents a translational amount between two origins in an image coordinate system and a digital image coordinate system, (x,y) represents the image coordinate values of the random point P, and (u,v) represents the digital image coordinate values of the random point P.

In yet another aspect, the present disclosure provides in some embodiments an automated driving system for a vehicle, including the above-mentioned device.

Usually, in the case that an optical distortion of a lens is not taken into consideration, the world coordinate values of a spatial point on an object are capable of being converted into the digital image coordinate values through four steps, i.e., the conversion from the world coordinate values $(X_w, Y_w, Z_w)$ into the camera coordinate values $(X_c, Y_c, Z_c)$, the conversion from the camera coordinate values into normalized image coordinate values $(x_u, y_u)$, the conversion from the normalized image coordinate values into the image coordinate values (x,y), and the conversion from the image coordinate values into the digital image coordinate values (u,v). In actual case, the influence of the optical distortion of the lens and a tangential distortion of the image sensor on the imaging may also be taken into consideration. Hence, the world coordinate values of the spatial point on the object may be converted into the digital image coordinate values through five steps, i.e., the world coordinate values—the camera coordinate values—the normalized image coordinate values—distorted normalized image coordinate values—the image coordinate values—the digital image coordinate values. A building procedure of the camera imaging model is complex and the imaging may be adversely affected by the distortion. In the embodiments of the present disclosure, the above five conversion steps are optimized, and a tangential distortion model is built in accordance with a rotating coordinate system when the imaging coordinate values are converted into the digital image coordinate values, so it is able to build the camera imaging model in an accurate and rapid manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE INVENTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An imaging procedure of a camera will be described as follows. A light beam from an object passes through a lens and imaged on an image plane. An optical signal is converted by an image sensor (e.g., a Charge Coupled Device (CCD)) into an electric signal. The electric signals are amplified and adjusted, and then converted into a digital image through sampling and quantification. Then, the digital image is output through a data output unit.

Figure 2:
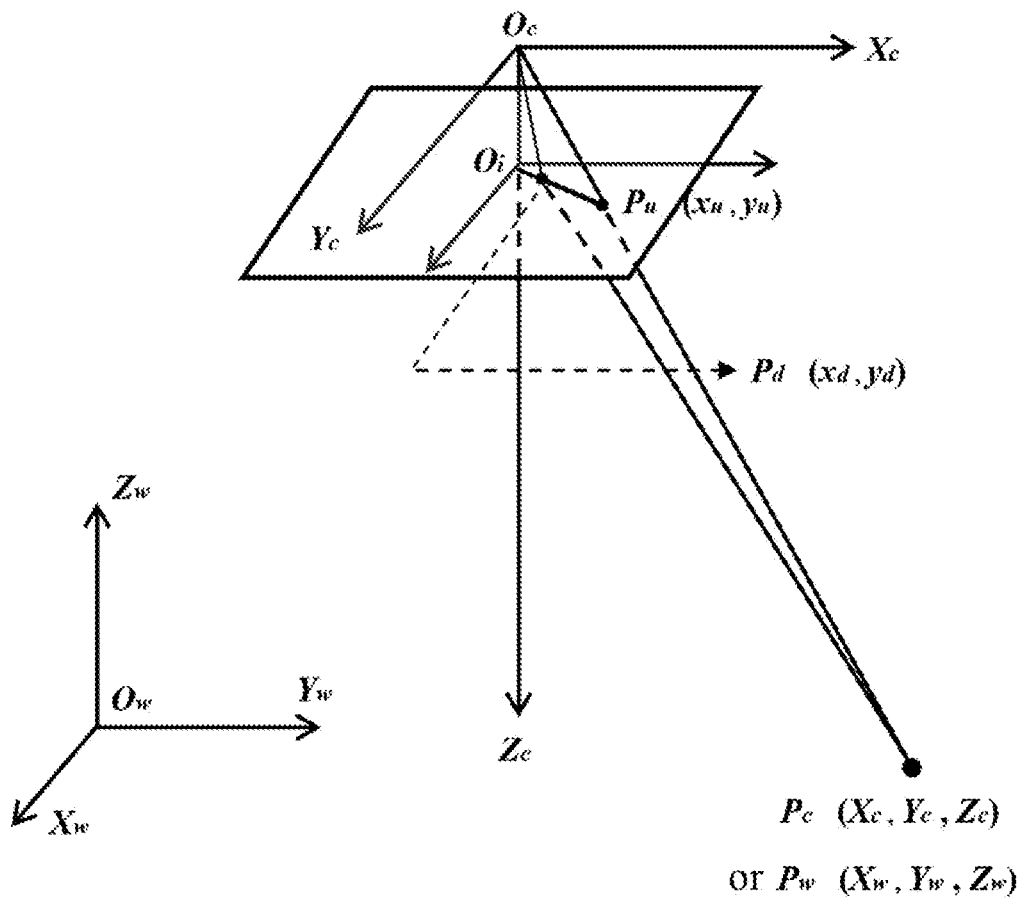
FIG. 2 is a schematic view showing a geometrical model of a camera (including transmission projection and a radial distortion of a lens) according to one embodiment of the present disclosure.

FIG. 2 shows a basic geometrical camera model, where $P_w(X_w, Y_w, Z_w)$ represents three-dimensional coordinate values of a random point P on the object in a world coordinate system, $P_c(X_c, Y_c, Z_c)$ represents three-dimensional coordinate values of the point P in a camera coordinate system in which an origin is an optical center $O_c$ and a $Z_c$ axis coincides with an optical axis, $P_u(x_u, y_u)$ represents two-dimensional coordinate values of an ideal transmission protection point of $P_c(X_c, Y_c, Z_c)$ in a normalized image coordinate system, $P_d(x_d, y_d)$ represents two-dimensional coordinate values of an actual transmission protection point in the normalized image coordinate system. As compared with $P_u(x_u, y_u)$, an optical distortion of a lens has been taken into consideration for $P_d(x_d, y_d)$.

In the case that the optical distortion of the lens is not taken into consideration, the world coordinate values of the spatial point on the object are capable of being converted into the digital image coordinate values through four steps, i.e., the conversion from the world coordinate values $(X_w, Y_w, Z_w)$ into the camera coordinate values $(X_c, Y_c, Z_c)$, the conversion from the camera coordinate values into the normalized image coordinate values $(x_u, y_u)$, the conversion from the normalized image coordinate values into image coordinate values (x,y), and the conversion from the image coordinate values into digital image coordinate values (u,v).

Figure 3:
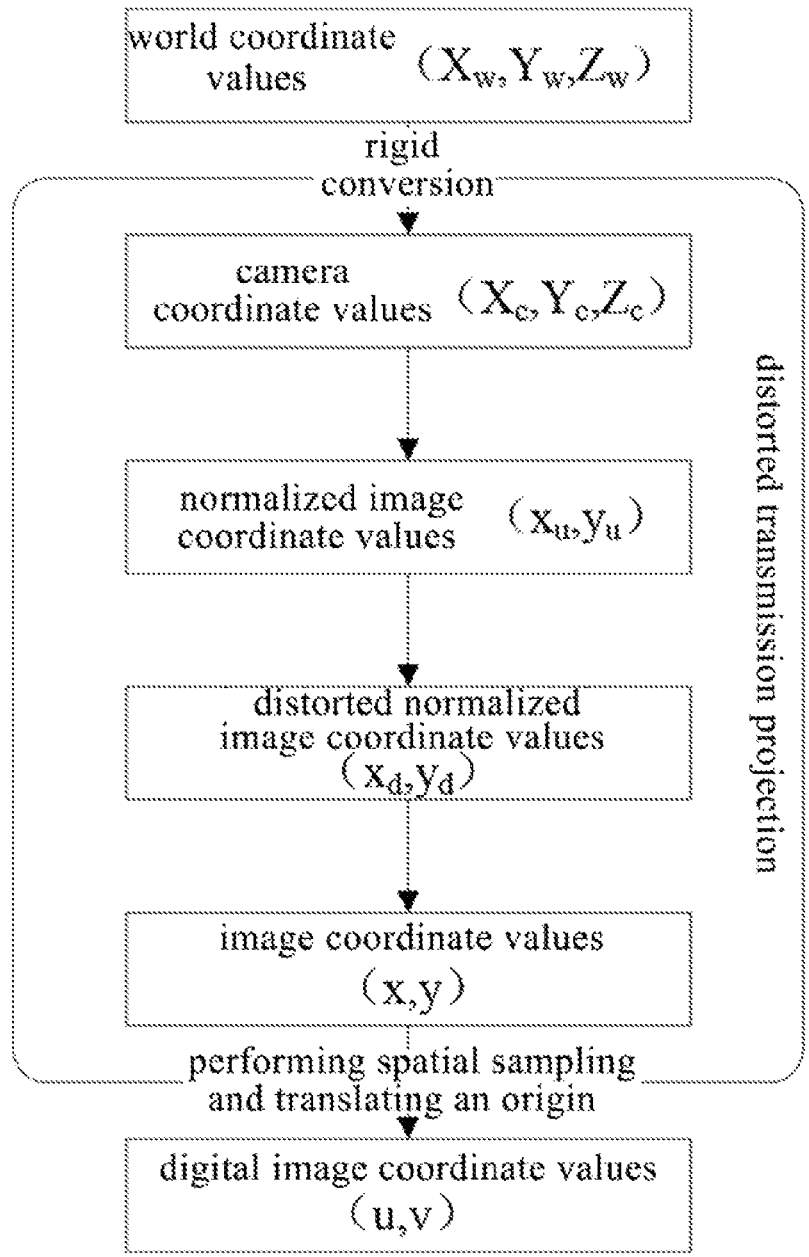
FIG. 3 is a schematic view showing the conversion from world coordinate values into digital image coordinate values according to one embodiment of the present disclosure.

In actual case, the influence of the optical distortion of the lens and a tangential distortion of the image sensor on the imaging may also be taken into consideration. Hence, the world coordinate values of the spatial point on the object may be converted into the digital image coordinate values as shown in FIG. 3.

Figure 1:
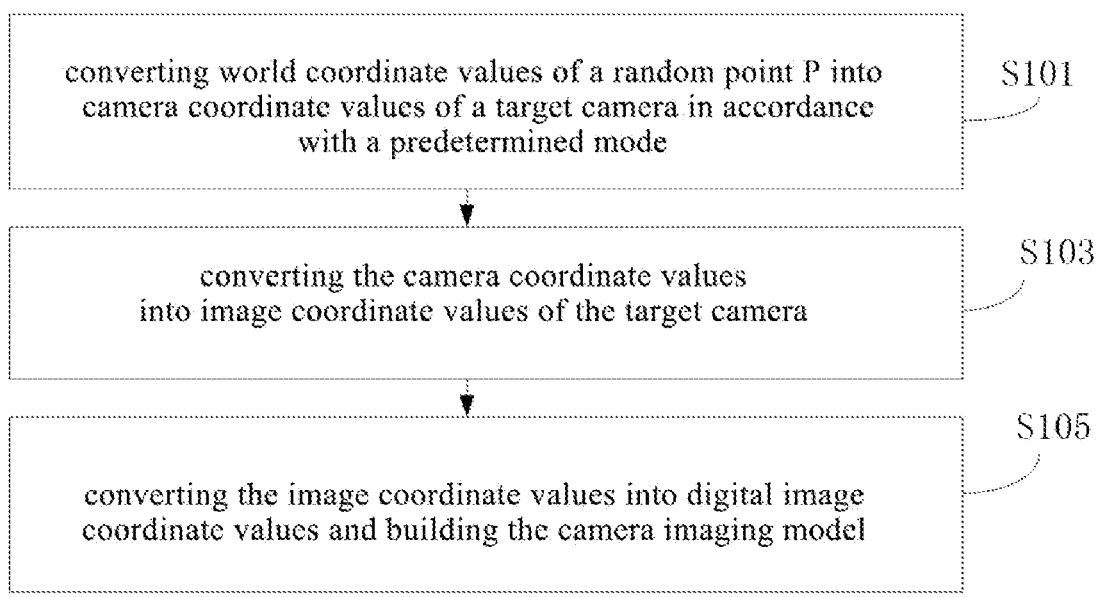
FIG. 1 is a flow chart of a method for building a camera imaging model according to one embodiment of the present disclosure.

The present disclosure provides in some embodiments a method for building a camera imaging model which, as shown in FIG. 1, includes: Step S101 of converting world coordinate values of a random point P into camera coordinate values of a target camera in accordance with a predetermined mode; Step S103 of converting the camera coordinate values into image coordinate values of the target camera; and Step S105 of converting the image coordinate values into digital image coordinate values and building the camera imaging model.

The converting the image coordinate values into the digital image coordinate values includes performing a spatial sampling operation on the random point P, and adjusting coordinate values of an origin to image coordinate values through the following formula:

$$\begin{cases} u = k_u x + u_0 \\ v = k_v y + v_0 \end{cases} \text{ or} \quad (1)$$

$$\begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix},$$

where $k_u = 1/dx$, $k_v = 1/dy$, dx and dy represent a horizontal sampling interval and a longitudinal sampling interval of an image sensor of the target camera respectively, $(u_0, v_0)$ represents a translational amount between two origins in an image coordinate system and a digital image coordinate system, $(x,y)$ represents the image coordinate values of the random point P, and $(u,v)$ represents the digital image coordinate values of the random point P.

In the embodiments of the present disclosure, in Step S101, the world coordinate values of the random point P may be converted into the camera coordinate values of the target camera as follows:

$$\begin{bmatrix} X_c \\ Y_c \\ Z_c \end{bmatrix} = \begin{bmatrix} r_1 & r_2 & r_3 \\ r_4 & r_5 & r_6 \\ r_7 & r_8 & r_9 \end{bmatrix} \begin{bmatrix} X_w \\ Y_w \\ Z_w \end{bmatrix} + \begin{bmatrix} t_x \\ t_y \\ t_z \end{bmatrix} = \begin{bmatrix} r_1 & r_2 & r_3 & t_x \\ r_4 & r_5 & r_6 & t_y \\ r_7 & r_8 & r_9 & t_z \end{bmatrix} \begin{bmatrix} X_w \\ Y_w \\ Z_w \\ 1 \end{bmatrix},$$

where $(X_w, Y_w, Z_w)$ represents the world coordinate values of the random point P, $(X_c, Y_c, Z_c)$ represents the camera coordinate values of the point P, $$R = \begin{bmatrix} r_1 & r_2 & r_3 \\ r_4 & r_5 & r_6 \\ r_7 & r_8 & r_9 \end{bmatrix}$$

represents a rotation matrix, and $$t = \begin{bmatrix} t_x \\ t_y \\ t_z \end{bmatrix}$$

represents a translation vector. A position and a direction of the camera in a world coordinate system have been described in the above conversion formula, and the rotation matrix R and the translation vector t are collectively called as exterior parameters of the camera.

Figure 4:
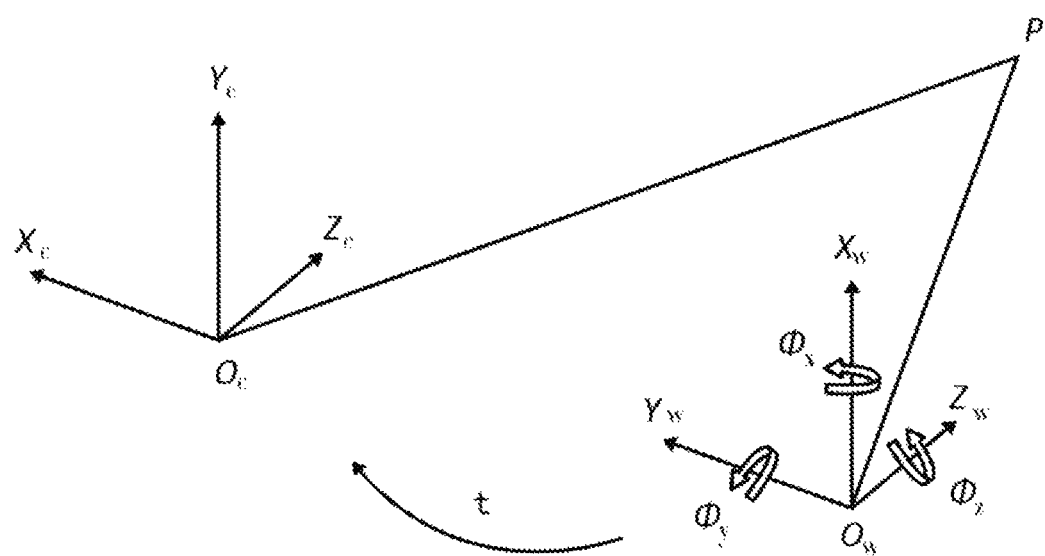
FIG. 4 is a schematic view showing a geometrical relationship between a world coordinate system and a camera coordinate system according to one embodiment of the present disclosure.

As shown in FIG. 4, the rotation matrix R is used to represent a rotation relationship between the world coordinate system $O_w X_w Y_w Z_w$ and the camera coordinate system $O_c X_c Y_c Z_c$, and t is used to represent a translational amount between origins of the two coordinate systems. The world coordinate system $O_w X_w Y_w Z_w$ may be rotated about its X-axis, Y-axis and Z-axis, and then the origin may be translated to $O_c$, so as to acquire the camera coordinate system $O_c X_c Y_c Z_c$. When the world coordinate system $O_w X_w Y_w Z_w$ rotate about the X-axis, the Y-axis and the Z-axis by rotation angles $\phi_x$, $\phi_y$ and $\phi_z$ respectively, the three rotation procedures may be mathematically expressed as follows:

$$Rot(X, \phi_x) = \begin{bmatrix} 1 & 0 & 0 \\ 0 & c\phi_x & -s\phi_x \\ 0 & s\phi_x & c\phi_x \end{bmatrix},$$

$$Rot(Y, \phi_y) = \begin{bmatrix} c\phi_y & 0 & s\phi_y \\ 0 & 1 & 0 \\ -s\phi_y & 0 & c\phi_y \end{bmatrix} \text{ and}$$

$$Rot(Z, \phi_z) = \begin{bmatrix} c\phi_z & -s\phi_z & 0 \\ s\phi_z & c\phi_z & 0 \\ 0 & 0 & 1 \end{bmatrix},$$

where $s\phi$ represents a sine of $\phi$, and $c\phi$ represents a cosine of $\phi$. The rotation matrix R may be expressed as follows:

$$R = Rot(Z, \phi_z) \cdot Rot(Y, \phi_y) \cdot$$

$$Rot(X, \phi_x) = \begin{bmatrix} c\phi_z c\phi_y & -s\phi_z c\phi_x + c\phi_z s\phi_y s\phi_x & s\phi_z s\phi_x + c\phi_z s\phi_y c\phi_x \\ s\phi_z c\phi_y & c\phi_z c\phi_x + s\phi_z s\phi_y s\phi_x & -c\phi_z s\phi_x + s\phi_z s\phi_y c\phi_x \\ -s\phi_y & c\phi_y s\phi_x & c\phi_y c\phi_x \end{bmatrix}.$$

Step S103 of converting the camera coordinate values into the image coordinate values of the target camera may include the following conversion procedures as shown in FIG. 3.

1. A conversion procedure from the camera coordinate values to normalized image coordinate values The conversion procedure from the camera coordinate values to the normalized image coordinate values may be mathematically expressed as follows:

$$\begin{cases} x_u = \dfrac{X_c}{Z_c} \\ y_u = \dfrac{Y_c}{Z_c} \end{cases},$$

where $(x_u, y_u)$ represents ideal normalized image coordinate values of the random point P, and $(X_c, Y_c, Z_c)$ represents the corresponding camera coordinate values of the random point P. A normalized image plane is actually an image plane perpendicular to an optical axis and spaced apart from a lens center by a unit distance. Point coordinate values on the normalized image plane are aurally homogeneous coordinate values of the random point P in the three-dimensional camera coordinate system. An origin of the normalized image coordinate system is an intersection between the optical axis and the normalized image plane.

Figure 5:
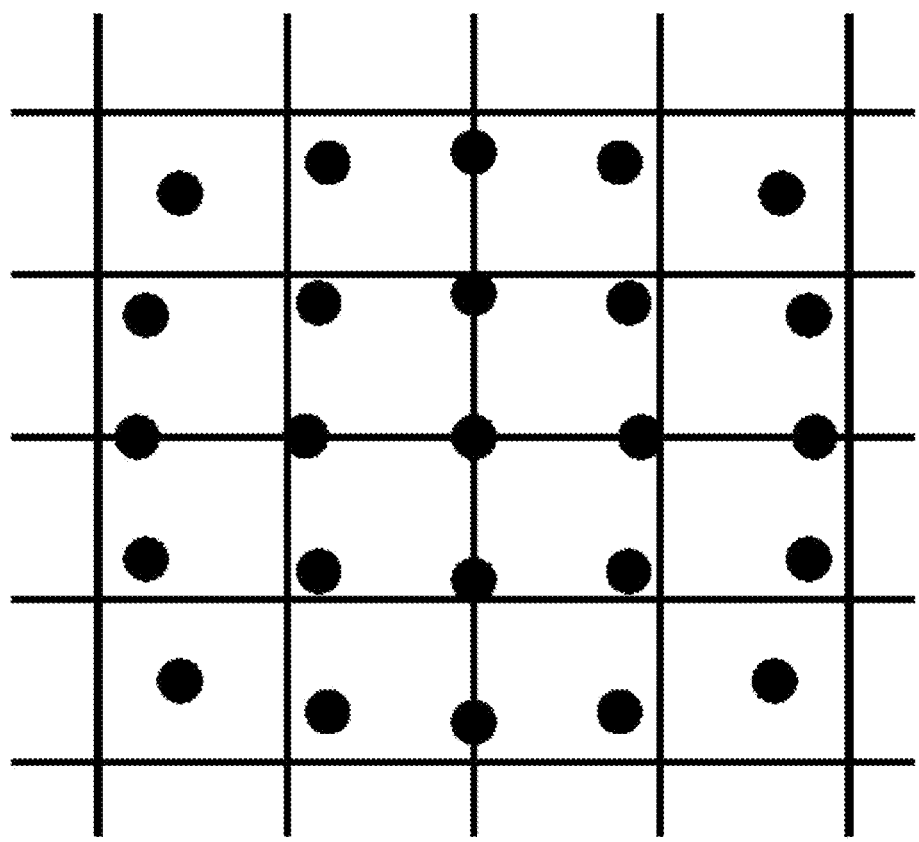
FIG. 5 is a schematic view showing an optical distortion of the lens according to one embodiment of the present disclosure.

2. A conversion procedure from the normalized image coordinate values to distorted normalized image coordinate values FIG. 5 shows an optical distortion of the lens, where each intersection of black grid lines is an ideal image coordinate point, and each black point is a corresponding distorted image coordinate point.

The optical distortion mainly occurs during the transmission protection conversion, and it is a non-linear conversion procedure. The optical distortion may be mathematically expressed as follows:

$$\begin{cases} x_d = x_u[1 + k_1(x_u^2 + y_u^2) + k_2(x_u^2 + y_u^2)^2 + k_3(x_u^2 + y_u^2)^3] \\ y_d = y_u[1 + k_1(x_u^2 + y_u^2) + k_2(x_u^2 + y_u^2)^2 + k_3(x_u^2 + y_u^2)^3] \end{cases},$$

where $(x_d, y_d)$ represents distorted normalized image coordinate values of the random point P, $(x_u, y_u)$ represents ideal normalized image coordinate values of the random point P, and $k_1$, $k_2$ and $k_3$ represent radial distortion coefficients of the lens respectively.

Figure 6:
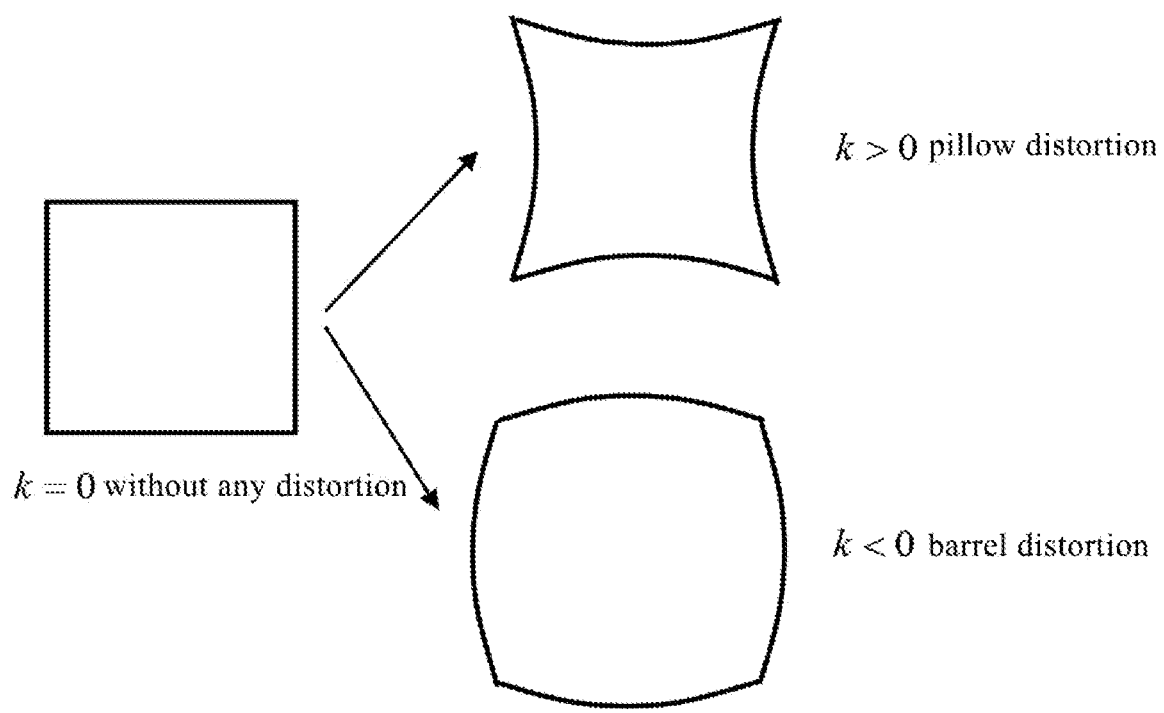
FIG. 6 is a schematic view showing the optical distortions according to one embodiment of the present disclosure.

As shown in FIG. 6, when $k_1$, $k_2$ and $k_3$ are each equal to 0, it means that there is no non-linear optical distortion, when $k_1$, $k_2$ and $k_3$ are each greater than 0, it means that there is a pillow distortion, and when $k_1$, $k_2$ and $k_3$ are each smaller than 0, it means that there is a barrel distortion.

3. A conversion procedure from the distorted normalized image coordinate values to the image coordinate values $$\begin{cases} x = fx_d \\ y = fy_d \end{cases} \text{ or } \begin{bmatrix} x \\ y \\ 1 \end{bmatrix} = \begin{bmatrix} f & 0 & 0 \\ 0 & f & 0 \\ 0 & 0 & 1 \end{bmatrix} \begin{bmatrix} x_d \\ y_d \\ 1 \end{bmatrix},$$

This conversion procedure may be mathematically expressed as follows:

where (x,y) represents image coordinate values of the spatial point P, $(x_d, y_d)$ represents the distorted normalized image coordinate values of the spatial point P. The normalized image plane is actually an image plane perpendicular to the optical axis and spaced apart from the lens center by an image distance f, where f represents a focal length of the lens), and the origin of the image plane coordinate system is an intersection between the optical axis and the normalized image plane. The reason why the image distance v for an imaging point is approximately represented by the focal length f of the lens lies in that an operating distance (i.e., an object distance) of the imaging system is far greater than the focal length f.

In Step S105, the image coordinate values may be converted into the digital image coordinate values, and then the camera imaging model may be built.

The image coordinate values may be converted into the digital image coordinate values through performing a spatial sampling operation on the random point P, and adjusting coordinate values of the origin to image coordinate values through the following formula:

$$\begin{cases} u = k_u x + u_0 \\ v = k_v y + v_0 \end{cases} \text{ or } \begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix}, \quad (1)$$

where $k_u = 1/dx$, $k_v = 1/dy$, dx and dy represent a horizontal sampling interval and a longitudinal sampling interval of an image sensor of the target camera respectively, $(u_0, v_0)$ represents a translational amount between two origins in an image coordinate system and a digital image coordinate system, (x,y) represents the image coordinate values of the random point P, and (u,v) represents the digital image coordinate values of the random point P.

Figure 7:
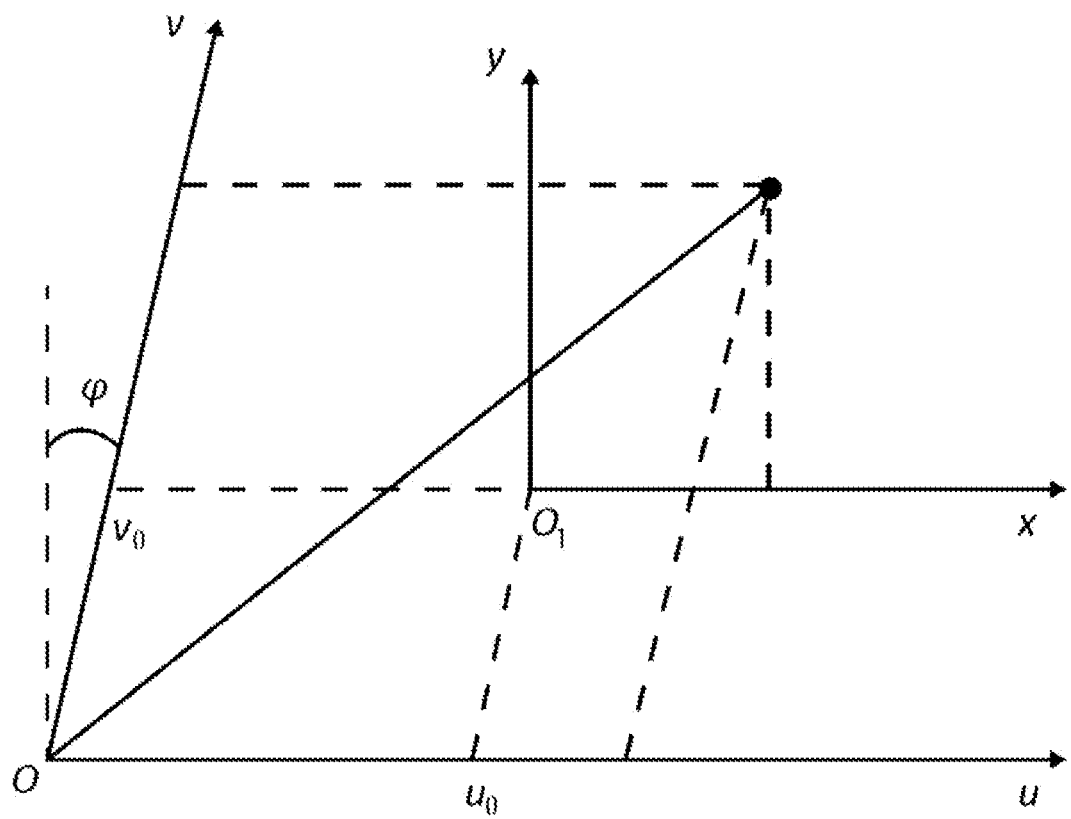
FIG. 7 is a schematic view showing a tangential distortion in an image digital coordinate system according to one embodiment of the present disclosure.

Actually, due to a manufacture process of the camera, it is impossible for a plane where the image sensor is located to completely coincide with an ideal image plane, so there is a tangential distortion between the two coordinate systems, as shown in FIG. 7. When the horizontal sampling interval and the longitudinal sampling interval are dx and dy respectively and the tangential distortion is taken into consideration, an image digitalization procedure may be expressed as:

$$\begin{cases} u = u_0 + \dfrac{x}{dx} - \dfrac{y\tan\varphi}{dx} \\ v = v_0 + \dfrac{y}{dy\cos\varphi} \end{cases}, \text{ or } \begin{bmatrix} u \\ v \\ 1 \end{bmatrix} = \begin{bmatrix} k_u & -k_u\tan\varphi & u_0 \\ 0 & k_v/\cos\varphi & v_0 \\ 0 & 0 & 1 \end{bmatrix} \begin{bmatrix} x \\ y \\ 1 \end{bmatrix},$$

where φ represents a tangential distortion angle between the image coordinate system and the digital image coordinate system, and a counter-clockwise direction is positive.

In a word, the five conversion procedures in FIG. 3 have been described hereinabove. Through optimizing the above five conversion procedures, in Step S105, it is able to build a tangential distortion model in accordance with a rotating coordinate system when the image coordinate values are converted into the digital image coordinate values, thereby to build the camera imaging model in an accurate and rapid manner.

Through the above steps, the camera imaging model may be expressed as:

$$s\begin{bmatrix} x_u \\ y_u \\ 1 \end{bmatrix} = \begin{bmatrix} r_1 & r_2 & r_3 & t_x \\ r_4 & r_5 & r_6 & t_y \\ r_7 & r_8 & r_9 & t_z \end{bmatrix}\begin{bmatrix} X_w \\ Y_w \\ Z_w \\ 1 \end{bmatrix}, \quad (a)$$

$$\begin{cases} x_d = x_u[1 + k_1(x_u^2 + y_u^2) + k_2(x_u^2 + y_u^2)^2 + k_3(x_u^2 + y_u^2)^3] \\ y_d = y_u[1 + k_1(x_u^2 + y_u^2) + k_2(x_u^2 + y_u^2)^2 + k_3(x_u^2 + y_u^2)^3] \end{cases}, \text{ and} \quad (b)$$

$$\begin{bmatrix} u \\ v \\ 1 \end{bmatrix} = A\begin{bmatrix} x_d \\ y_d \\ 1 \end{bmatrix} = \begin{bmatrix} fk_u & -fk_u\tan\varphi & u_0 \\ 0 & fk_v/\cos\varphi & v_0 \\ 0 & 0 & 1 \end{bmatrix}\begin{bmatrix} x_d \\ y_d \\ 1 \end{bmatrix}, \quad (c)$$

where s represents a scaling factor and has a value of $1/Z_c$, the formula (a) is used to describe the conversion from the world coordinate values to the normalized image coordinate values, the formula (b) is used to describe the conversion from the normalized image coordinate values to the distorted normalized image coordinate values, $k_1$, $k_2$ and $k_3$ represent radial distortion coefficients of the lens respectively, the formula (c) is used to describe the conversion from the distorted normalized image coordinate values to the digital image coordinate values, matrix A represents an exterior parameter of the camera and includes five degrees of freedom, i.e., two components of scaling, one components of rotation and two components of translation.

Figure 8:
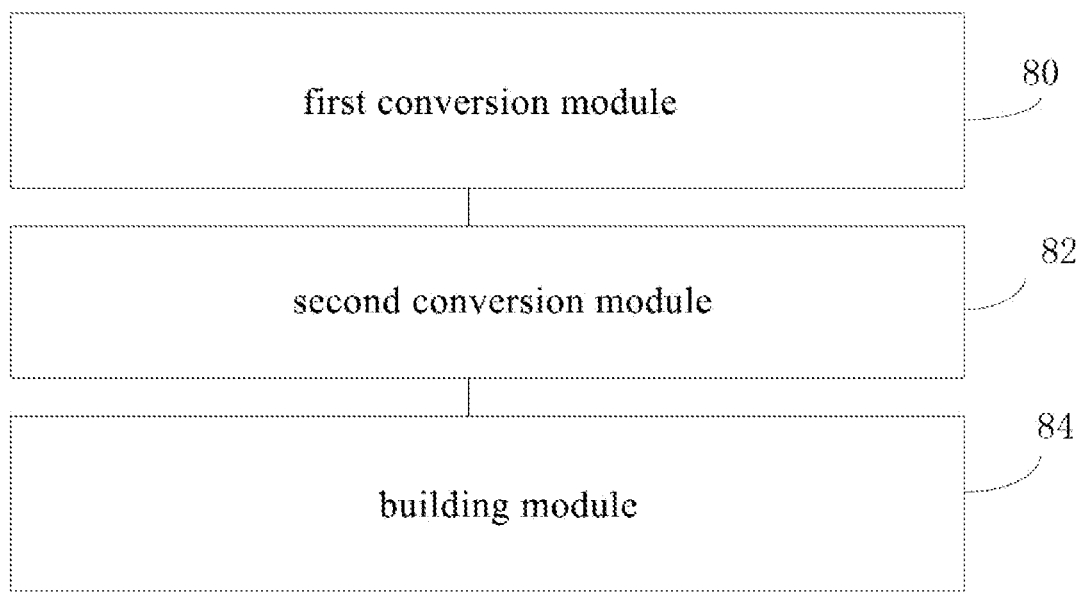
FIG. 8 is a schematic view showing a device for building the camera imaging model according to one embodiment of the present disclosure.

The present disclosure further provides in some embodiments a device for building a camera imaging model which, as shown in FIG. 8, includes: a first conversion module 80 configured to convert world coordinate values of a random point P into camera coordinate values of a target camera in accordance with a predetermined mode; a second conversion module 82 configured to convert the camera coordinate values into image coordinate values of the target camera; and a building module 84 configured to convert the image coordinate values into digital image coordinate values and build the camera imaging model. The building module is further configured to perform a spatial sampling operation on the random point P, and adjust coordinate values of an origin to image coordinate values through the following formula:

$$\begin{cases} u = k_u x + u_0 \\ v = k_v y + v_0 \end{cases} \text{ or } \begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix}, \quad (1)$$

where $k_u=1/dx$, $k_v=1/dy$, dx and dy represent a horizontal sampling interval and a longitudinal sampling interval of an image sensor of the target camera respectively, $(u_0,v_0)$ represents a translational amount between two origins in an image coordinate system and a digital image coordinate system, (x,y) represents the image coordinate values of the random point P, and (u,v) represents the digital image coordinate values of the random point P.

In a possible embodiment of the present disclosure, the first conversion module 80 includes a rotation module (not shown) configured to rotate a world coordinate system $O_w X_w Y_w Z_w$ of the random point P about its X-axis, Y-axis and Z-axis, and translate the origin to $O_c$, so as to acquire a camera coordinate system $O_c X_c Y_c Z_c$, where $(X_w,Y_w,Z_w)$ represents the world coordinate values of the random point $(X_c,Y_c,Z_c)$ represents the camera coordinate values of the random point P, $O_w$ represents the origin of the random point P in the world coordinate system, and $O_c$ represents the origin of the random point P in the camera coordinate system.

In a possible embodiment of the present disclosure, the second conversion module 82 includes: a first conversion submodule (not shown) configured to convert the camera coordinate values into normalized image coordinate values; a second conversion submodule (not shown) configured to convert the normalized image coordinate values into distorted normalized image coordinate values; and a third conversion submodule (not shown) configured to convert the distorted normalized image coordinate values into the image coordinate values.

The present disclosure further provides in some embodiments an automated driving system for a vehicle, which includes the above-mentioned device. The vehicle can be, e.g., an automobile such as a bus, a car, or a truck.

Usually, apart from the four conversion procedures, i.e., the conversion from the world coordinate values $(X_w,Y_w,Z_w)$ into the camera coordinate values $(X_c,Y_c,Z_c)$, the conversion from the camera coordinate values into normalized image coordinate values $(x_u,y_u)$, the conversion from the normalized image coordinate values into the image coordinate values (x,y), and the conversion from the image coordinate values into the digital image coordinate values (u, v), the optical distortion of the lens and the tangential distortion of the image sensor may also be taken into consideration, so the camera imaging model may be built through the five conversion procedures. Through the optimization of the five conversion procedures, it is able to build the tangential distortion model in accordance with the rotating coordinate system when the imaging coordinate values are converted into the digital image coordinate values, thereby to build the camera imaging model in an accurate and rapid manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for building a camera imaging model, comprising:

converting world coordinate values of a random point P into camera coordinate values of a target camera in accordance with a predetermined mode;

converting the camera coordinate values into image coordinate values of the target camera; and converting the image coordinate values into digital image coordinate values and building the camera imaging model, wherein the converting the image coordinate values into the digital image coordinate values comprises performing a spatial sampling operation on the random point P, and adjusting digital image coordinate values of an origin to image coordinate values through the following formula:

$$\begin{cases} u = k_u x + u_0 \\ v = k_v y + v_0 \end{cases} \text{ or } \begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix}, \quad (1)$$

where $k_u=1/dx$, $k_v=1/dy$, dx and dy represent a horizontal sampling interval and a longitudinal sampling interval of an image sensor of the target camera respectively, $(u_0,v_0)$ represents a translational amount between two origins in an image coordinate system and a digital image coordinate system, (x,y) represents the image coordinate values of the random point P, and (u,v) represents the digital image coordinate values of the random point P.

2. The method according to claim 1, wherein the converting the world coordinate values of the random point P into the camera coordinate values of the target camera in accordance with the predetermined mode comprises rotating a world coordinate system $O_w X_w Y_w Z_w$ of the random point P about its X-axis, Y-axis and Z-axis, and translating the origin to $O_c$, so as to acquire a camera coordinate system $O_c X_c Y_c Z_c$, where $(X_w,Y_w,Z_w)$ represents the world coordinate values of the random point P, $(X_c,Y_c,Z_c)$ represents the camera coordinate values of the random point P, Ow represents the origin of the random point P in the world coordinate system, and $O_c$ represents the origin of the random point P in the camera coordinate system.

3. The method according to claim 1, wherein the converting the camera coordinate values into the image coordinate values of the target camera comprises: converting the camera coordinate values into normalized image coordinate values; converting the normalized image coordinate values into distorted normalized image coordinate values; and converting the distorted normalized image coordinate values into the image coordinate values.

4. The method according to claim 3, wherein the converting the camera coordinate values into the normalized image coordinate values comprises converting the camera coordinate values into the normalized image coordinate values through the following formula:

$$\begin{cases} x_u = \dfrac{X_c}{Z_c} \\ y_u = \dfrac{Y_c}{Z_c} \end{cases}, \quad (2)$$

where $(x_u,y_u)$ represents ideal normalized image coordinate values of the random point P, and $(X_c,Y_c,Z_c)$ represents the corresponding camera coordinate values of the random point P.

5. The method according to claim 3, wherein the converting the normalized image coordinate values into the distorted normalized image coordinate values comprises converting the normalized image coordinate values into the distorted normalized image coordinate values through the following formula $$\begin{cases} x_d = x_u[1 + k_1(x_u^2 + y_u^2) + k_2(x_u^2 + y_u^2)^2 + k_3(x_u^2 + y_u^2)^3] \\ y_d = y_u[1 + k_1(x_u^2 + y_u^2) + k_2(x_u^2 + y_u^2)^2 + k_3(x_u^2 + y_u^2)^3] \end{cases}, \quad (3)$$

where $(x_d, y_d)$ represents the distorted normalized image coordinate values of the random point P, $(x_u, y_u)$ represents the ideal normalized image coordinate values of the random point P, and $k_1$, $k_2$ and $k_3$ represent radial distortion coefficients of the lens respectively.

6. The method according to claim 3, wherein the converting the distorted normalized image coordinate values into the image coordinate values comprises converting the distorted normalized image coordinate values into the image coordinate values through the following formula:

$$\begin{cases} x = fx_d \\ y = fy_d \end{cases} \text{ or } \begin{bmatrix} x \\ y \\ 1 \end{bmatrix} = \begin{bmatrix} f & 0 & 0 \\ 0 & f & 0 \\ 0 & 0 & 1 \end{bmatrix} \begin{bmatrix} x_d \\ y_d \\ 1 \end{bmatrix}, \quad (4)$$

where $(x,y)$ represents image coordinate values of the spatial point P, $(x_d, y_d)$ represents the distorted normalized image coordinate values of the spatial point P, and f represents a focal length of the lens.

7. The method according to claim 6, wherein the building the camera imaging model comprises acquiring the camera imaging model through the following formulae:

$$s \begin{bmatrix} x_u \\ y_u \\ 1 \end{bmatrix} = \begin{bmatrix} r_1 & r_2 & r_3 & t_x \\ r_4 & r_5 & r_6 & t_y \\ r_7 & r_8 & r_9 & t_z \end{bmatrix} \begin{bmatrix} X_w \\ Y_w \\ Z_w \\ 1 \end{bmatrix}, \quad (a)$$

$$\begin{cases} x_d = x_u[1 + k_1(x_u^2 + y_u^2) + k_2(x_u^2 + y_u^2)^2 + k_3(x_u^2 + y_u^2)^3] \\ y_d = y_u[1 + k_1(x_u^2 + y_u^2) + k_2(x_u^2 + y_u^2)^2 + k_3(x_u^2 + y_u^2)^3] \end{cases} \text{ and} \quad (b)$$

$$\begin{bmatrix} u \\ v \\ 1 \end{bmatrix} = A \begin{bmatrix} x_d \\ y_d \\ 1 \end{bmatrix} = \begin{bmatrix} fk_u & -fk_u\tan\varphi & u_0 \\ 0 & fk_v/\cos\varphi & v_0 \\ 0 & 0 & 1 \end{bmatrix} \begin{bmatrix} x_d \\ y_d \\ 1 \end{bmatrix}, \quad (c)$$

where s represents a scaling factor and has a value of $1/Z_c$, the formula (a) is used to describe the conversion from the world coordinate values to the normalized image coordinate values, the formula (b) is used to describe the conversion from the normalized image coordinate values to the distorted normalized image coordinate values, $k_1$, $k_2$ and $k_3$ represent radial distortion coefficients of the lens respectively, the formula (c) is used to describe the conversion from the distorted normalized image coordinate values to the digital image coordinate values, and the matrix A represents an exterior parameter of the camera and includes five degrees of freedom, i.e., two components of scaling, one components of rotation and two components of translation.

8. A device for building a camera imaging model, comprising:

a first conversion module configured to convert world coordinate values of a random point P into camera coordinate values of a target camera in accordance with a predetermined mode;
a second conversion module configured to convert the camera coordinate values into image coordinate values of the target camera; and
a building module configured to convert the image coordinate values into digital image coordinate values and build the camera imaging model,
wherein the building module is further configured to perform a spatial sampling operation on the random point P, and adjust digital image coordinate values of an origin to image coordinate values through the following formula:

$$\begin{cases} u = k_u x + u_0 \\ v = k_v y + v_0 \end{cases} \text{ or } \begin{bmatrix} u \\ v \\ 1 \end{bmatrix} = \begin{bmatrix} k_u & 0 & u_0 \\ 0 & k_v & v_0 \\ 0 & 0 & 1 \end{bmatrix} \begin{bmatrix} x \\ y \\ 1 \end{bmatrix}, \quad (1)$$

where $k_u=1/dx$, $k_v=1/dy$, dx and dy represent a horizontal sampling interval and a longitudinal sampling interval of an image sensor of the target camera respectively, $(u_0, v_0)$ represents a translational amount between two origins in an image coordinate system and a digital image coordinate system, $(x,y)$ represents the image coordinate values of the random point P, and $(u,v)$ represents the digital image coordinate values of the random point P.

9. The device according to claim 8, wherein the first conversion module comprises a rotation module configured to rotate a world coordinate system $O_w X_w Y_w Z_w$ of the random point P about its X-axis, Y-axis and Z-axis, and translate the origin to $O_c$, so as to acquire a camera coordinate system $O_c X_c Y_c Z_c$, where $(X_w, Y_w, Z_w)$ represents the world coordinate values of the random point P, $(X_c, Y_c, Z_c)$ represents the camera coordinate values of the random point P, Ow represents the origin of the random point P in the world coordinate system, and $O_c$ represents the origin of the random point P in the camera coordinate system.

10. An automated driving system for a vehicle, comprising the device according to claim 8 mounted on the vehicle.

11. An automated driving system for a vehicle, comprising: a first conversion module configured to convert world coordinate values of a random point P into camera coordinate values of a target camera in accordance with a predetermined mode; and
a second conversion module configured to convert the camera coordinate values into image coordinate values of the target camera,
wherein the first conversion module comprises a rotation module configured to rotate a world coordinate system $O_w X_w Y_w Z_w$ of the random point P about its X-axis, Y-axis and Z-axis, and translate the origin to $O_c$, so as to acquire a camera coordinate system $O_c X_c Y_c Z_c$, where $(X_w, Y_w, Z_w)$ represents the world coordinate values of the random point P, $(X_c, Y_c, Z_c)$ represents the camera coordinate values of the random point P, Ow represents the origin of the random point P in the world coordinate system, and $O_c$ represents the origin of the random point P in the camera coordinate system;
the converting the camera coordinate values into the image coordinate values of the target camera comprises: converting the camera coordinate values into normalized image coordinate values; and the converting the camera coordinate values into the normalized image coordinate values comprises converting the camera coordinate values into the normalized image coordinate values through the following formula:

$$\begin{cases} x_u = \dfrac{X_c}{Z_c} \\ y_u = \dfrac{Y_c}{Z_c} \end{cases}, \quad (2)$$

where $(x_u, y_u)$ represents ideal normalized image coordinate values of the random point P, and $(X_c, Y_c, Z_c)$ represents the corresponding camera coordinate values of the random point P.

\* \* \* \* \*